US009225492B2

(12) United States Patent
Paiva et al.

(10) Patent No.: US 9,225,492 B2
(45) Date of Patent: Dec. 29, 2015

(54) CYCLIC PREFIX BASED OPPORTUNISTIC TRANSMISSION/RECEPTION SCHEME FOR INTERFERENCE CANCELATION

(71) Applicant: NOKIA CORPORATION, Espoo (FI)

(72) Inventors: Rafael Paiva, Manaus (BR); Andre Mendes Cavalcante, Manaus (BR); Robson Domingos Vieira, Brasilia (BR); Fabiano Chaves, Manaus (BR); Fuad Abinader, Jr., Manaus (BR); Angilberto Sobrinho, Manaus (BR); Erika Almeida, Manaus (BR)

(73) Assignee: NOKIA TECHNOLOGIES OY, Espoo (FI)

( * ) Notice: Subject to any disclaimer, the term of this patent is extended or adjusted under 35 U.S.C. 154(b) by 162 days.

(21) Appl. No.: 13/859,252

(22) Filed: Apr. 9, 2013

(65) Prior Publication Data
US 2014/0301282 A1     Oct. 9, 2014

(51) Int. Cl.
| | |
|---|---|
| *H04B 3/20* | (2006.01) |
| *H04L 5/00* | (2006.01) |
| *H04L 27/26* | (2006.01) |
| *H04J 11/00* | (2006.01) |

(52) U.S. Cl.
CPC ............ *H04L 5/0062* (2013.01); *H04J 11/004* (2013.01); *H04L 27/2602* (2013.01); *H04L 27/2607* (2013.01); *H04L 27/2647* (2013.01)

(58) Field of Classification Search
USPC .......... 370/268, 286, 332, 437; 455/137, 138, 455/139, 296
See application file for complete search history.

(56) References Cited

U.S. PATENT DOCUMENTS

| | | | | | |
|---|---|---|---|---|---|
| 3,757,235 | A | * | 9/1973 | McCormick et al. | 327/551 |
| 4,470,138 | A | * | 9/1984 | Gutleber | 370/342 |
| 5,732,113 | A | * | 3/1998 | Schmidl et al. | 375/355 |
| 6,298,035 | B1 | * | 10/2001 | Heiskala | 370/206 |
| 6,693,984 | B1 | * | 2/2004 | Andre | 375/350 |
| 8,055,234 | B2 | * | 11/2011 | Mattisson et al. | 455/296 |
| 2010/0091789 | A1 | | 4/2010 | Choi et al. | |

(Continued)

FOREIGN PATENT DOCUMENTS

| | | |
|---|---|---|
| WO | WO 2012/056091 A1 | 5/2012 |
| WO | 2014/051606 A1 | 4/2014 |
| WO | 2014/064322 A1 | 5/2014 |

OTHER PUBLICATIONS

Andrews, J.G., "Interference cancellation for cellular systems: a contemporary overview", IEEE Wireless Communications, vol. 12, issue 2, Apr. 2005, pp. 19-29.

(Continued)

*Primary Examiner* — Phuc Tran
(74) *Attorney, Agent, or Firm* — Squire Patton Boggs (US) LLP (57) ABSTRACT

Systems, methods, apparatuses, and computer program products for interference cancelation are provided. One method includes forming, by a wireless system, a signal structure to match a structure of an interfering signal with repetitive time structure. The method may further include using the formed signal structure to eliminate interference caused by the interfering signal. The signal structure includes parts that are synchronized with the repeated parts of the interfering signal structure to cancel the repetition of the interference, and the signal structure further comprises another part synchronized with the non-repeated parts of the interference signal.

24 Claims, 7 Drawing Sheets

(56) References Cited

U.S. PATENT DOCUMENTS

| | | | |
|---|---|---|---|
| 2010/0284298 A1 | 11/2010 | Xia et al. | |
| 2012/0106364 A1 | 5/2012 | Kasslin et al. | |
| 2012/0108179 A1 | 5/2012 | Kasslin et al. | |
| 2013/0128807 A1* | 5/2013 | Vermani et al. | 370/328 |
| 2014/0315501 A1* | 10/2014 | Rudell et al. | 455/78 |

OTHER PUBLICATIONS

Mahmoud, H., "OFDM for cognitive radio: merits and challenges", IEEE Wireless Communications, vol. 16, issue 2, Apr. 2009, pp. 6-14.

Popovski, P., et al., "Opportunistic Interference Cancellation in Cognitive Radio Systems", DySPAN 2007, pp. 472-475.

Maham, B., et al., "Opportunistic interference cancelation and user selection in cognitive multiple access network", IEEE 13th International Workshop on Signal Processing Advances in Wireless Communications (SPAWC), 2012, pp. 174-178.

Agus Santoso, Yang Tang, Branka Vucetic, Abbas Jamalipour; and Yonghui Li, "Interference Cancellation in Coexisting Wireless Local Area Networks", ICCS 2006, 6 pages.

Cumanan, K., et al., "Joint Beamforming and User Maximization Techniques for Cognitive Radio Networks Based on Branch and Bound Method", IEEE Trans. on Wireless Communications, vol. 9, Issue: 10, Oct. 2010, pp. 3082-3092.

Villardi, G.P. et al., "Enabling coexistence of multiple cognitive networks in TV white space", IEEE Wireless Communications, pp. 32-40, Aug. 2011.

A. Cavalcante, et al. "Performance Evaluation of LTE and Wi-Fi coexistence in unlicensed bands", VTC Spring 2013, Dresden, Germany (paper accepted for publication), 6 pages.

Hendra Setiawan, Masayuki Kurosaki, Hiroshi Ochi, "LTE Physical Layer Identity Detection: Frequency vs Time Domain Schemes", Proc. IEEE ICC 2011, 5 pages.

Zhongshan Zhang, Jian Liu, and Keping Long, "Low-Complexity Cell Search With Fast PSS Identification in LTE", IEEE Transactions on Vehicular Technology, vol. 61, No. 4, May 2012, pp. 1719-1729.

Xiumei Yang, Yong Xiong, Guoqing Jia, Weidong Fang, Xiaoying Zheng, "PSS Based Time Synchronization for 3GPP LTE Downlink Receivers", Proc. IEEE ICCT 2011, pp. 930-933.

Eldad Perahia et al., "Next Generation Wireless LANs: Throughput, Robustness, and Reliability in 802.11n" Cambridge Univeristy Press 2008 (Complete Hard Copy of book enclosed).

Wen Xu, Konstantinos Manolakis "Robust Synchronization for 3GPP LTE System" Proc. IEEE Globecom 2010 (pp. 1-5).

* cited by examiner

CYCLIC PREFIX BASED OPPORTUNISTIC TRANSMISSION/RECEPTION SCHEME FOR INTERFERENCE CANCELATION

BACKGROUND

1. Field

Embodiments of the invention generally relate to communication networks, such as wireless networks. More specifically, embodiments may relate to interference cancelation in wireless networks.

2. Description of the Related Art

Considerable research and development in wireless communications has been dedicated to cognitive radio and the coexistence of different wireless communications technologies. In these types of systems, a given frequency band may be shared between different wireless technologies. This sharing of frequency bands can result in interference among the different wireless technologies, or can even result in one system blocking the other. In order to enhance the spectrum usage, some coexistence strategy may be required so that different technologies are able to use the resources in an efficient manner.

Coexistence strategies are usually defined as cooperative or non-cooperative. The cooperative strategies often include some type of agreement between the systems in order to get a fair spectrum share. Cooperative strategies often result in one system giving away some of its resources to the other. As a result, the application of cooperative strategies may not result in benefits to the system that is mostly giving away its resources. On the other hand, non-cooperative strategies can be implemented without the consideration of one system sharing its resources with the other. Although non-cooperative technologies may result in smaller overhead and typically cheaper implementation, they will usually be less efficient than the cooperative strategies.

SUMMARY

One embodiment is directed to a method for interference cancelation. The method may include forming, by a wireless system, a signal structure to match a structure of an interfering signal with repetitive time structure. The method may further include using the formed signal structure to eliminate interference caused by the interfering signal. The signal structure includes parts that are synchronized with repeated parts of the interfering signal structure to cancel a repetition of the interference, and the signal structure further comprises another part synchronized with non-repeated parts of the interfering signal.

Another embodiment is directed to an apparatus. The apparatus includes at least one processor and at least one memory comprising computer program code. The at least one memory and the computer program code configured, with the at least one processor, to cause the apparatus at least to form a signal structure in a wireless system to match a structure of an interfering signal with repetitive time structure, and to use the formed signal structure to eliminate interference caused by the interfering signal. The signal structure includes parts that are synchronized with repeated parts of the interfering signal structure to cancel a repetition of the interference, and the signal structure further comprises another part synchronized with non-repeated parts of the interfering signal.

Another embodiment is directed to a computer program, embodied on a computer readable medium, wherein the computer program is configured to control a processor to perform a process. The process includes forming a signal structure in a wireless system to match a structure of an interfering signal with repetitive time structure, and using the formed signal structure to eliminate interference caused by the interfering signal. The signal structure includes parts that are synchronized with repeated parts of the interfering signal structure to cancel a repetition of the interference, and the signal structure further comprises another part synchronized with non-repeated parts of the interfering signal.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of a system, a method, an apparatus, and a computer program product for interference cancelation, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

One embodiment provides a non-cooperative coexistence strategy, based on exploring the OFDM symbols structure for interference cancelation purposes.

Uncoordinated spectrum sharing is a difficult task when technologies have different access schemes. As an example, if LTE and WiFi are deployed in the same spectrum and location, WiFi senses that the channel is busy due to a LTE transmission for most of the time, and, consequently, WiFi is blocked most of the time. On the other hand, if WiFi loosens its Carrier sense multiple access with collision avoidance (CSMA/CA) thresholds, the high interference caused by LTE could increase significantly the packet error rate of WiFi. Hence, it is highly desirable to obtain effective interference cancelation techniques that enable coexistence between different systems or technologies.

It should be noted that, while embodiments described herein use LTE and WiFi as examples of wireless technologies to which embodiments can be applied, embodiments of the invention are not limited to these example technologies. For example, embodiments may be applicable to wireless networks including, but not limited to, radio access networks such as the Universal Mobile Telecommunications System (UMTS) Terrestrial Radio Access Network (UTRAN) Long Term Evolution (LTE) and Evolved UTRAN (E-UTRAN) or LTE-A, High Speed Packet Access (HSPA) and HSPA+, wireless local area networks (WLAN) such as WiFi, and WiMAX, or any other legacy, current, or future wireless technology.

Figure 1A:
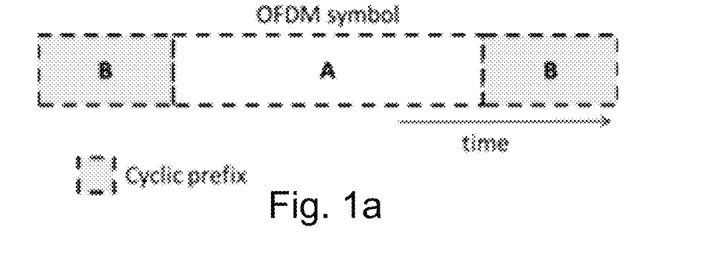
FIG. 1a illustrates an example of the time structure of an OFDM signal, according to an embodiment.

Certain embodiments provide a solution for interference cancelation, for example, when different technologies use the same spectrum band. In one embodiment, a non-cooperative interference cancelation transmit/receive scheme is provided, where the structure of orthogonal frequency-division multiplexing (OFDM) signals is considered. OFDM signals have a predefined symbols structure that may be used for interference cancelation. FIG. 1a illustrates an example of the time structure of an OFDM symbol. In particular, FIG. 1a depicts an overview of an OFDM symbol time structure, where B represents the cyclic prefix and its repetition, and A represents the symbol part without redundancy. In this structure, the time domain signal is created by processing the frequency domain OFDM symbol using an inverse fast Fourier transform (IFFT). Additionally, as depicted in FIG. 1a, the cyclic prefix is inserted repeating B at the beginning of the signal. Hence, FIG. 1a illustrates that an OFDM signal has a known redundancy which can be exploited for interference cancelation, according to certain embodiments discussed in detail below.

An objective of the transmit/receive scheme, according to one embodiment, is the transmission of data in an extreme non-cooperative interference condition where one technology would take over the channel while the other is completely blocked by interference. Additionally, certain embodiments may also be used in situations where simultaneous transmissions of two technologies are desirable.

Figure 1B:
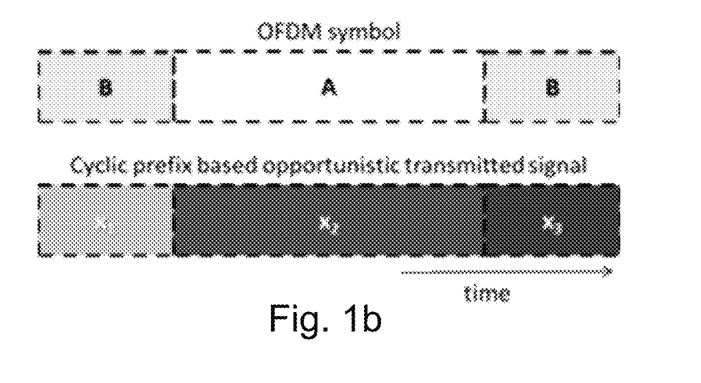
FIG. 1b illustrates an example of a cyclic prefix based opportunistic signal, according to one embodiment.

Certain embodiments provide for the design of a signal structure that matches the structure of an OFDM symbol, as illustrated in FIG. 1b. For example, FIG. 1b illustrates an overview of the opportunistic scheme, where $x_1$ and $x_3$ are synchronized with the cyclic prefix and its repetition, and $x_2$ is aligned with the rest of the symbol (e.g., A). In this embodiment, the transmitted signals $x_1$ and $x_3$ are respectively chosen in order to cancel the cyclic prefix and its repetition, and to reconstruct the desired signal in an optimum way. A general description of the solution, according to one embodiment, is described according to the following formulas:

$$x_1 = k_{1,1} s_1 + k_{1,2} s_2 \quad\quad \text{Equation 1}$$

$$x_3 = k_{3,1} s_1 + k_{3,2} s_2 \quad\quad \text{Equation 2}$$

where $s_1$ and $s_2$ are two data signals, and $k_{n,m}$ represents the mapping of data signal $s_m$ into the transmitted signal $x_n$. The data signals $s_m$ may include OFDM symbols, or any other type of modulated signal with a symbol length smaller than the length of the cyclic prefix of the interfering technology.

Since embodiments take into consideration the cyclic prefix redundancy, some embodiments may be referred to as cyclic prefix based opportunistic transmission/reception (CPoTx). However, other naming conventions can be used according to other embodiments.

One implementation for Equation 1 and Equation 2 includes ignoring the second data signal $s_2$, and making $k_{1,1}=1$ and $k_{1,2}=-1$ in Equation 1 and Equation 2, which yields:

$$x_1 = -x_3 = s \quad\quad \text{Equation 3}$$

Once the result of Equation 3 is applied, the received signals $y_1$ and $y_3$ are obtained as:

$$y_1 = h*x_1 + g*B + n_1 = h*s + g*B + n_1 \quad\quad \text{Equation 4}$$

$$y_3 = h*x_3 + g*B + n_2 = -h*s + g*B + n_2 \quad\quad \text{Equation 5}$$

where h and g represent the channel impulse response for the signal s and B, respectively, n represents the noise, and the symbol "*" represents the time domain convolution. Given the received signals at Equation 4 and Equation 5, the effect of the interference over s and B can be removed by performing:

$$r_s = \frac{y_1 - y_3}{2} \approx h*s + \frac{n_1 - n_3}{2} \quad\quad \text{Equation 6}$$

$$r_B = \frac{y_1 + y_3}{2} \approx g*B + \frac{n_1 + n_3}{2} \quad\quad \text{Equation 7}$$

where $r_s$ is the received signal after canceling the interference B, and $r_b$ is the received signal after canceling s.] The result of Equation 6 shows that the interference of the cyclic prefix can be completely canceled at the receiver when choosing the transmission scheme of Equation 3. In other words, according to an embodiment, the cyclic prefix repetition of the interfering signal can be completely removed in the received signal. In the example of Equation 7, the term g*B of the LTE interference is completely removed since B is repeated twice and g is the same for both repetitions. Thus, certain embodiments provide a solution which can be used in extreme interference conditions with high interference level. In this embodiment, an interference with large power has known OFDM structure, with a symbol length which is larger than the symbol length of a second technology. Given this knowledge, certain embodiments are able to transmit a repeated version of the desired signal with opposite phase at the repeated version of the cyclic prefix, which enables perfect elimination of the interference as in Equation 6. As an additional advantage of the implementation of Equation 3, perfect elimination of the interference in the cyclic prefix of the interferer for estimation of B is enabled by Equation 7. This is an important result, since both technologies would have the means for interference cancelation once the structure of FIG. 1(b) is known. Additionally, the solutions of Equation 6 and Equation 7 provide an additional 3 dB signal-to-noise ratio (SNR) gain, due to the averaging of the noise.

In another embodiment, one additional implementation of Equation 1 and Equation 2 is possible without repetition of the message, as:

$$x_3 = -s \quad\quad \text{Equation 8}$$

$$x_1 = 0 \quad\quad \text{Equation 9}$$

In this embodiment, the data message is only transmitted at the repeated cyclic prefix. The received signal is the same as in Equation 5, and the interference over s can be removed as:

$$r_s = y_1 - y_3 \approx h*s + n_1 - n_3 \quad\quad \text{Equation 10}$$

This embodiment yields smaller power consumption, since there is no repetition of the data message. However, this embodiment assumes that no other source of interference is present at the cyclic prefix, and any other source of interference will be included at the noise terms. Secondly, the 3 dB SNR gain will not be observed in this embodiment, since there is no averaging operation for estimating s.

Figure 2:
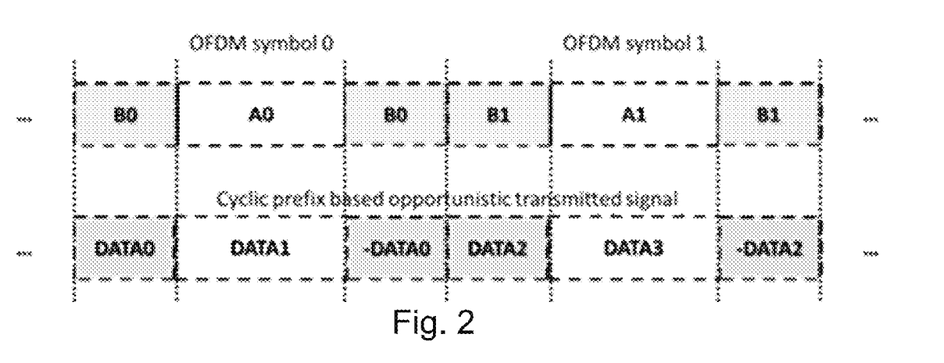
FIG. 2 illustrates an example of the cyclic prefix based opportunistic transmission scheme for two OFDM symbols, according to an embodiment.

FIG. 2 illustrates an example of the cyclic prefix based opportunistic transmission scheme for two OFDM symbols, according to an embodiment. In the example of FIG. 2, the DATA0 and DATA2 parts are repeated with opposite signals for optimum interference cancelation at the receiver.

Figure 3:
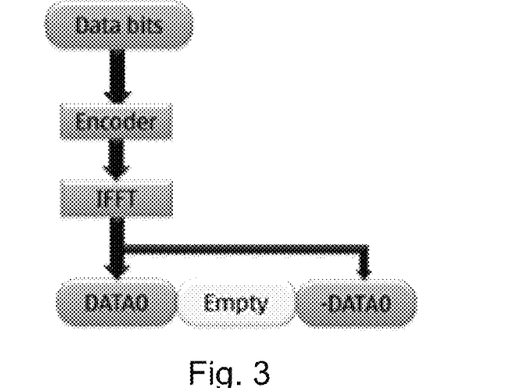
FIG. 3 illustrates an example of an OFDM transmitter structure for cyclic prefix based opportunistic transmission, according to an embodiment.

FIG. 3 illustrates an example of the OFDM transmitter implementations for the CPoTx transmission scheme, according to one embodiment. In this implementation, only the cyclic prefix protected portion of the time is used. This implementation can be applied for interference scenarios where transmitting at the non-robust part is useless, or when it would be best used by another user.

According to one embodiment, both the transmitter and the receiver may be synchronized with the interfering technology. In an embodiment, this can be done using autocorrelation methods, or using the synchronization signals of the interfering technology. As an exemplary implementation, if the interferer technology is LTE, for example, the primary synchronization signal (PSS) and secondary synchronization signal symbol (SSS) can be used for synchronization. If the interference is from another technology, technology-specific synchronization signals can be used, or a simpler estimation of the beginning of symbol times can be obtained using autocorrelation metrics. Secondly, the transmitter can build the transmitted signal as in FIG. 3, where one part of the signal is repeated at the cyclic prefix of the interfering technology.

Changes at the medium access control (MAC) layer of both the transmitter and the receiver are also necessary. For instance, the receiver may need to be made aware of the use of CPoTx transmitting structure, and this indication can be implemented with special signaling between the transmitter and receiver. Examples of possible implementations of such signaling for WiFi include the access point (AP) notifying the stations (STAs) at network subscription and authentication stages, or using special Information Element (IE) fields at regular MAC protocol data unit (MPDU) headers. Additionally, if a WiFi network uses this technique, its AP may have a special field in its beacon indicating that this feature is enabled.

As an example of implementation for WiFi, when an AP detects it is blocked by LTE it can switch to an operation mode where it only transmits or receives MPDUs using CPoTx as the transmission structure, which includes Beacon transmission and regular MPDUs. Also, as part of this exemplary implementation, the AP might define that when CPoTx is used then all resource allocations are scheduled by the AP, which for that might use polling techniques like 802.11n power-save multi-poll (PSMP) for implementing such centralized scheduling. This exemplary implementation allows the AP to better utilize the scarce resources while coexisting with another technology.

Figure 4:
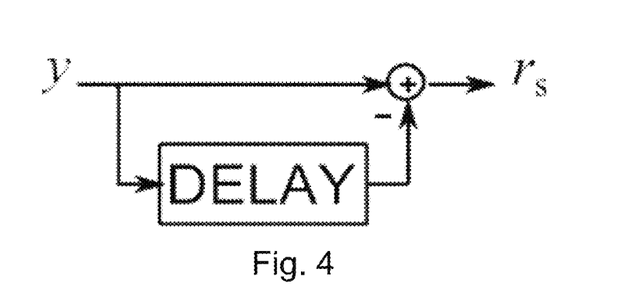
FIG. 4 illustrates an example of a comb filter, according to one embodiment.

Additionally, the receiver may need to combine the repetitions of the signal. This can be implemented using a comb filter that implements Equation 6, as illustrated in the example of FIG. 4, where the DELAY element may implement a fractional delay filter if the sampling frequencies of both technologies are not matched. On the interferer side no changes are required in order for this technique to work. In case of WiFi and LTE coexistence, for example, the required changes may need to be implemented only in WiFi Tx/Rx chain.

According to certain embodiments, one advantage is to guarantee a minimum throughput in extreme interference scenarios. One example of such a scenario is in which a WiFi (i.e., IEEE 802.11 standard) network coexists with an LTE network. In this example, the LTE network will block the WiFi network for most of the time. It has been shown that, in this scenario, the WiFi network usually remains in contention mode for at least 90% of the time and is nearly never able to access the channel, resulting in a decrease in WiFi user throughput of between 50% and 100% depending on the network scenario. However, when embodiments of the invention are applied, the WiFi network would be able to have additional channel access time The performance of certain embodiments can be analyzed as discussed in the following. The maximum throughput of the CPoTx protected period is calculated as throughput when no interference is present, multiplied by an scaling factor $\beta_{CPoTx}$ given by:

$$\beta_{CPoTx} = \frac{T_{CPoTx}}{T_{INTERF}} \qquad \text{Equation 11}$$

where $T_{CPoTx}$ is the useful time inside the cyclic prefix of the interferer where the CPoTx signal can be transmitted, and $T_{INTERF}$ is the interference symbol length. It is noted that $T_{CPoTx}$ is bounded by the length of the cyclic prefix of the interference $T_{CPoTx} \leq T_{CP}$, and will usually be an integer multiple of the symbol length of the transmitting technology.

The simulations presented below are based on the scenario where an IEEE 802.11ac network coexists with a LTE network. Although the results are shown for this case, they could be easily generalized for coexistence with other technologies and are, therefore not limited to this example. In this simulation scenario, a 20 MHz LTE interferer using long cyclic prefix interferes in a WiFi network with 4 μs symbol length. Since the LTE interferer has 16.67 μs cyclic prefix length, four WiFi symbols are transmitted at each cyclic prefix period. This results in 16 μs being used by WiFi for transmission of CPoTx signals, yielding a throughput factor $\beta_{CPoTx}=0.19$.

Figure 5:
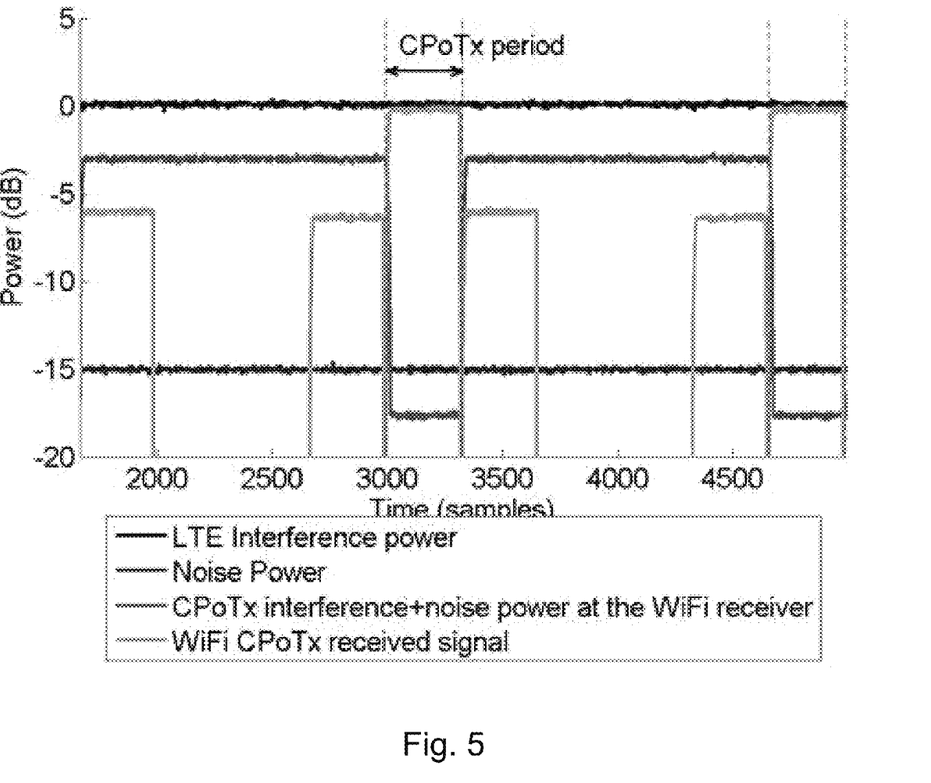
FIG. 5 illustrates an example of interference cancelation results, according to an embodiment.

The interference cancelation results are illustrated as average power over 2000 iterations in FIG. 5. In the example of FIG. 5, an LTE interference which is 15 dB larger than the noise floor is analyzed. This interference is resampled to 20 MHz bandwidth, and is filtered by a 10 taps complex finite impulse response (FIR) filter emulating a channel impulse response. The interference cancelation test is performed by filtering the LTE interference by an FIR filter emulating the operation of Equation 6. In practice, this operation is likely performed only over the cyclic prefix repetitions, but it is shown here for illustrative purposes. When observing these results, one notices that the overall interference power is reduced 3 dB in most of the time due to the averaging operation, and that this interference is further reduced 3 dB below the noise floor level during the repetition of the cyclic prefix. This shows that the interference can be effectively cancelled during the CPoTx periods. Additionally, the same filtering process may be applied to a WiFi signal using the CPoTx scheme as presented in Equation 3 and FIG. 3. The results in FIG. 5 show that the power of the WiFi signal is kept constant at the CPoTx period while the interference is canceled, leading to an SINR improvement of 18 dB.

One additional conclusion can be taken from FIG. 5 with respect to the synchronization of WiFi with LTE. In some embodiments, the CPoTx technique may require synchronization with the interferer. When observing the curve of CPoTx interference+noise power in FIG. 5, it is possible to conclude that a simple FIR filtering process can be used for synchronizing the system using CPoTx with the interferer cyclic prefix if the symbol length of the interference is known. This illustrates the feasibility of this technique when the synchronization with the interference symbols is considered.

Figure 6A:
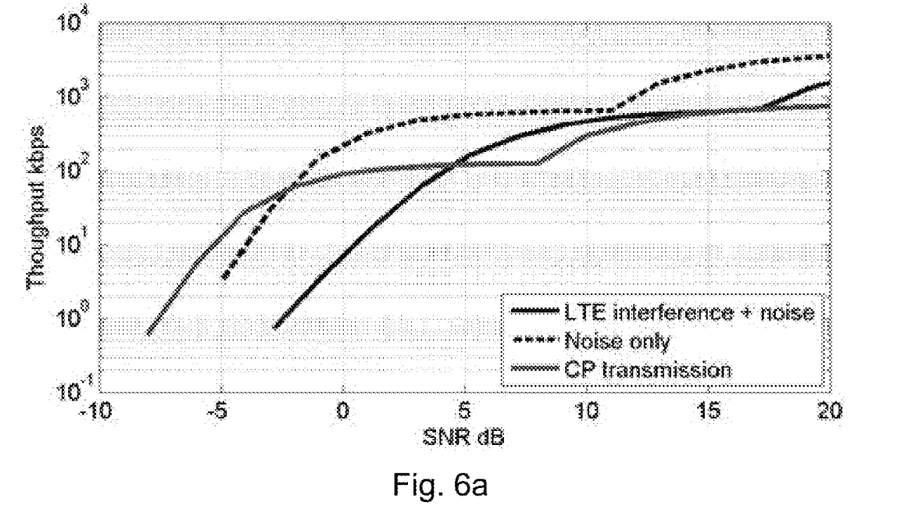
FIG. 6a illustrates resulting throughput achieved according to certain embodiments.

The throughput gain of the CPoTx method, according to certain embodiments, is illustrated in FIG. 6a. In the example results illustrated in FIG. 6a, the baseline WiFi throughput curves were obtained by link level simulations with LTE interference 5 dB over the noise floor level. The WiFi curves were generated with MCS 0, 4 and 8, and perfect link adaptation between them is assumed. The curves are presented in terms of signal to noise levels (SNR), hence the "LTE interference+noise" curve is shifted in comparison to the "noise only" curve. The CPoTx only of the scheme of FIG. 3 is labeled as "CP transmission", and is calculated by multiplying the "noise only" curve by the factor $\beta_{CPoTx}=0.19$, and shifting this curve by 3 dB to emulate the noise attenuation obtained with the averaging operation.

Figure 6B:
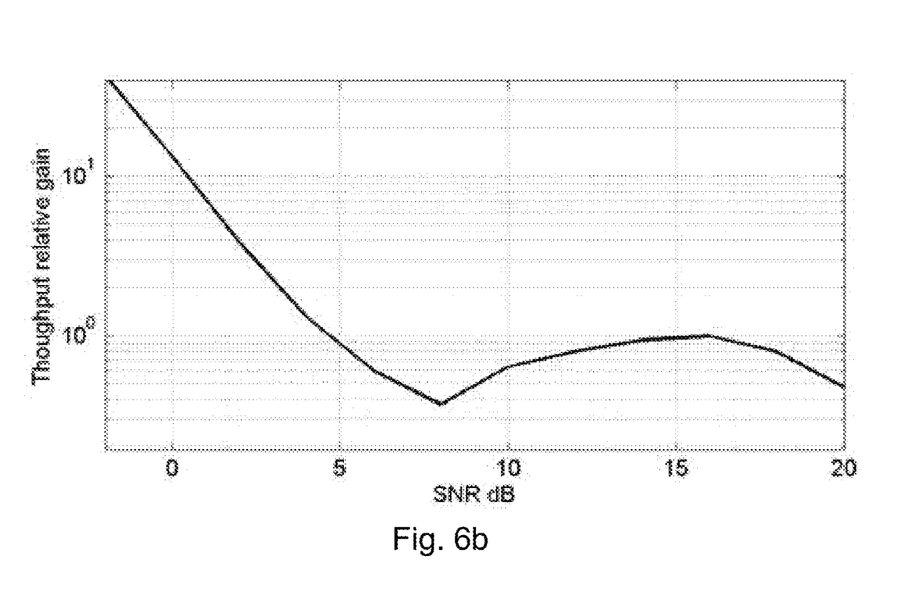
FIG. 6b illustrates throughput gain achieved according to certain embodiments.

The "CP transmission" throughput results of FIG. 6a show significant gains when compared to the case where interference is present at low SNRs. These results illustrate that embodiments are capable of yielding some connectivity for users under extreme interference conditions. Overall, the throughput gain is illustrated in FIG. 6b, which may be significantly high for SNRs below 5 dB SNR. Additionally, the throughput gain is negative for SNRs larger than 5 dB. The reason for this behavior is that the maximum throughput obtained with the CPoTx is proportional to and limited by the effective time for data transmission, and above a certain level of SNR (about 5 dB in this example), the WiFi transmission without interference cancelation becomes reasonable. Thus, FIG. 6b illustrates that the CPoTx should not be used for large SNRs, and some adaptation procedure from CPoTx to/from normal mode could be used.

It should be also noted that the example results illustrated in FIG. 6 apply for an interferer 5 dB above the noise floor. However, if the interference is larger, the expected throughput gains according to certain embodiments of the CPoTx method are expected to yield even larger gains. In this case, the "LTE interference+noise" curve illustrated in FIG. 6a would be shifted further to the right hand side direction, while the "CP transmission" would remain unchanged.

Figure 7A:
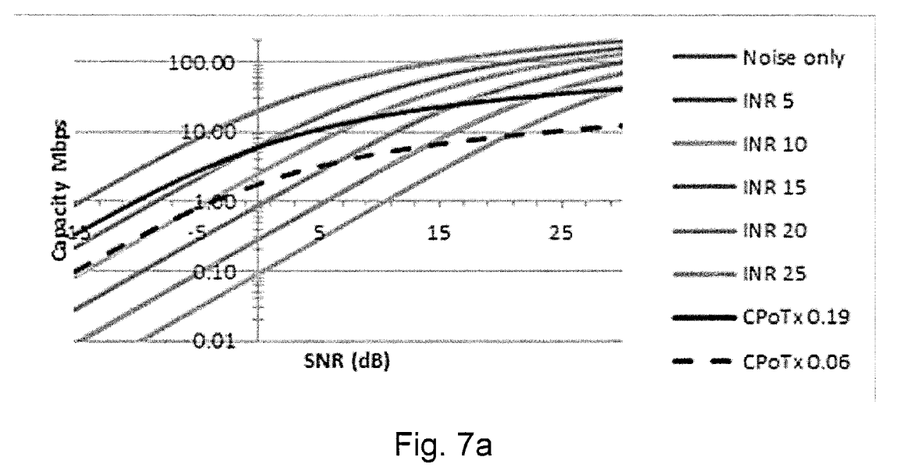
FIG. 7a illustrates an example of Shannon capacity analysis in interference conditions for certain embodiments.

FIG. 7 illustrates the generalization of the results in FIG. 6, according to an embodiment. In the example of FIG. 7, the Shannon theoretic capacity for a 20 MHz channel may be calculated as:

$$C(\rho) = BW\log_2\left(1 + \frac{1}{\rho + P_i}\right) \quad \text{Equation 12}$$

where $\rho$ is the noise power with SNR=$-10\log_{10}(\rho)$, $P_i$ is the interference power, and BW is the bandwidth. The capacity of Equation 12 is determined considering that the interference has the same effect as the noise in the channel capacity. Additionally, the noise and interference power are related by the interference to noise ratio (INR), INR=$10\log_{10}(P_i/\rho)$. On the other hand, the capacity when using the CPoTx may be calculated as:

$$C_{CPoTx}(\rho) = \beta_{CPoTx}BW\log_2\left(1 + \frac{2}{\rho}\right) \quad \text{Equation 13}$$

It is noted that the SNR term in Shannon's formula is increased by two and the interference term $P_i$ is zero, since the CPoTx filter of Equation 6 decreases the noise power by 3 dB. However, the capacity using the CPoTx is never larger than the capacity in Additive white Gaussian noise (AWGN) channel with $P_i=0$, since the factor $\beta_{CPoTx}$ is always smaller than 0.5. In an embodiment, $\beta_{CPoTx}$ is the throughput scaling factor, for example, used to obtain the CPoTx throughput when the throughput without CPoTx is available. FIG. 7 illustrates the results for LTE long CP length with $\beta_{CPoTx}=0.19$ and LTE short CP length with $\beta_{CPoTx}=0.06$.

Figure 7B:
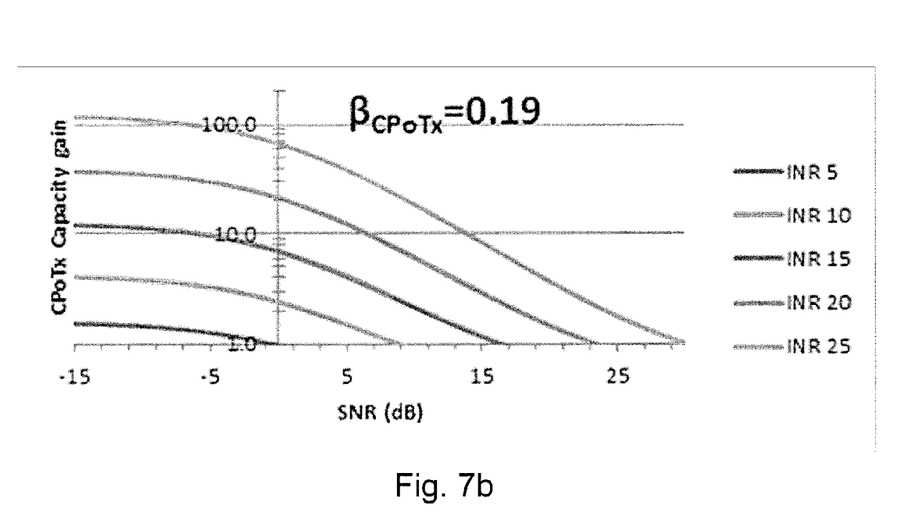
FIG. 7b illustrates an example of Shannon capacity gain analysis in interference conditions for certain embodiments.

The results in the example of FIG. 7b illustrate that when LTE's long CP length is used, embodiments of the CPoTx method provide gains when the interference to noise ratio (INR) is larger than 5 dB. Furthermore, the gains become significantly large for high INR values. As an example, the CPoTx gain at SNR=$-15$ dB is 4 for INR=10 dB and 370 for INR=30 dB. Additionally, the SNR range in which the CPoTx yields gains increases with the INR increase. The CPoTx results in gains larger than 1 when the SNR is smaller than 9, 16 and 23 for INR equal to 10, 15 and 20, respectively.

Figure 7C:
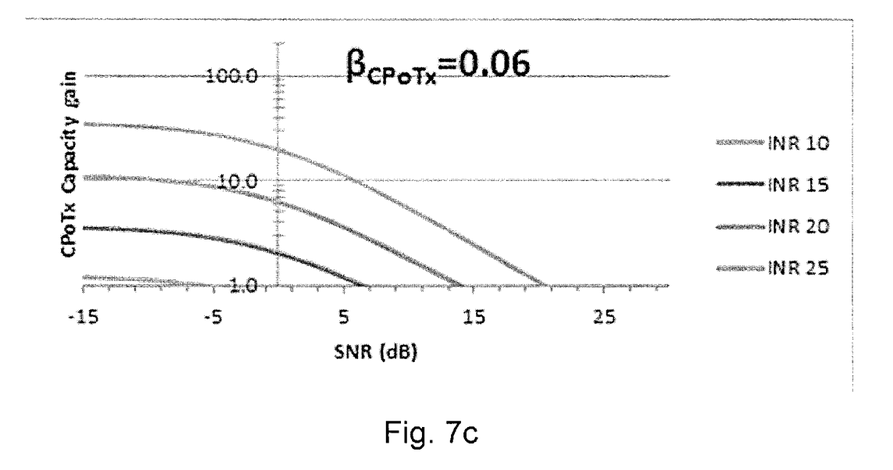
FIG. 7c illustrates an example of Shannon capacity gain analysis in interference conditions for certain embodiments.

The theoretical gains for LTE's short CP length are illustrated in FIG. 7c. Even with the small amount of available resources, embodiments of the CPoTx method are capable of yielding significant capacity gains when the INR is large.

Figure 8:
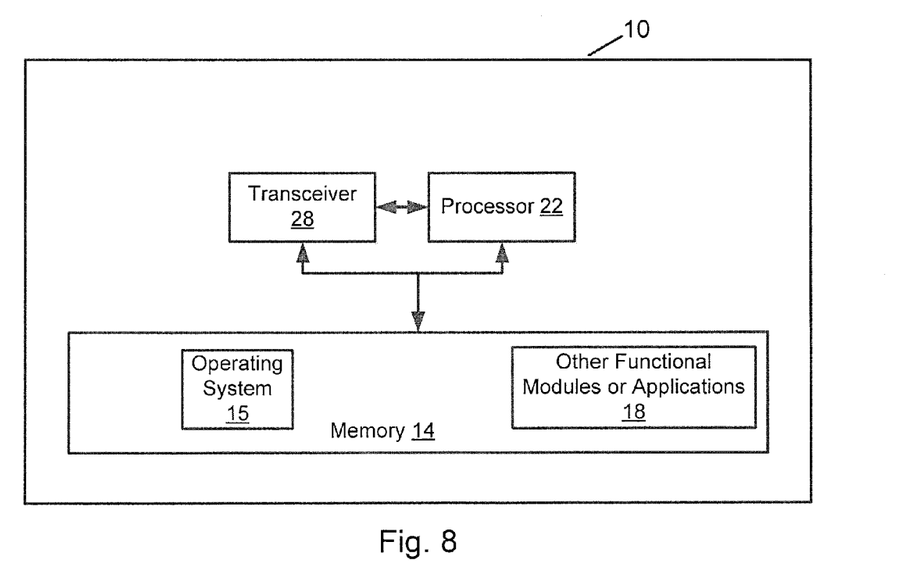
FIG. 8 illustrates an apparatus, according to one embodiment.

FIG. 8 illustrates an apparatus 10 according to one embodiment. Apparatus 10 may include a processor 22 for processing information and executing instructions or operations. Processor 22 may be any type of general or specific purpose processor. While a single processor 22 is shown in FIG. 8, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

In an embodiment, apparatus 10 may further include a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly. According to one embodiment, apparatus 10 may include an OFDM transmitter structure for cyclic prefix based opportunistic transmission, as illustrated in FIG. 3 and discussed in detail above. In addition, in one embodiment, apparatus 10 may also include a comb filter for receiving a cyclic prefix based opportunistic transmission, as illustrated in FIG. 4 and outlined above.

According to an embodiment, processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

According to certain embodiments, processor 22 and/or memory 14 may cause apparatus 10 to form a signal structure to match a structure of an orthogonal frequency-division multiplexing (OFDM) symbol of another wireless system, and to use the formed signal structure to completely eliminate interference caused by the OFDM symbol. For example, apparatus 10 may be caused to transmit the formed signal structure to cancel the interference caused by the OFDM symbol. As outlined above, the signal structure may include a first part (i.e., $x_1$) synchronized to cancel a cyclic prefix of the OFDM symbol and a third part (i.e., $x_3$) synchronized to cancel a repetition of the cyclic prefix of the OFDM symbol, and the signal structure may further include a second part (i.e., $x_2$) synchronized with a remainder of the OFDM signal. Apparatus 10 may be configured to form and apply the signal structure as discussed above in connection with Equations 1-13 and FIGS. 1-4, for example, to cancel interference.

Figure 9:
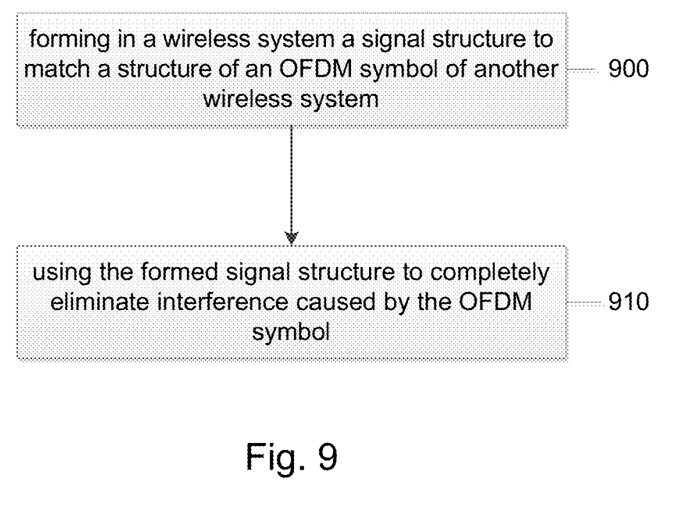
FIG. 9 illustrates a flow diagram of a method, according to an embodiment.

FIG. 9 illustrates a flow diagram of a method for canceling interference, according to one embodiment. The method may include, at 900, forming, for example by a node in wireless system, a signal structure to match a structure of an orthogonal frequency-division multiplexing (OFDM) symbol of another wireless system. The method may further include, at 910, using the formed signal structure to completely eliminate interference caused by the OFDM symbol, for example, by transmitting the formed signal structure to cancel the interference caused by the OFDM symbol. The details of the formed signal structure and its application are as discussed above.

In some embodiments, the functionality of any of the methods described herein may be implemented by software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

The computer readable media mentioned above may be at least partially embodied by a transmission line, a compact disk, digital-video disk, a magnetic disk, holographic disk or tape, flash memory, magnetoresistive memory, integrated circuits, or any other digital processing apparatus memory device.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Further, One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   forming, by a wireless system, a signal structure to match a structure of an interfering signal with repetitive time structure;
   using the formed signal structure to eliminate interference caused by the interfering signal;
   wherein the signal structure comprises parts that are synchronized with repeated parts of the interfering signal structure to cancel a repetition of the interference, and the signal structure further comprises another part synchronized with non-repeated parts of the interfering signal.

2. The method according to claim 1, wherein the interfering signal results from an orthogonal frequency-division multiplexing (OFDM) symbol of another wireless system, and the repetition of the interference signal is caused by a repetition of a cyclic prefix of the OFDM symbol.

3. The method according to claim 2, wherein the signal structure comprises a first part synchronized to cancel the cyclic prefix of the OFDM symbol and a third part synchronized to cancel a repetition of the cyclic prefix of the OFDM symbol, and the signal structure further comprises a second part synchronized with a remainder of the OFDM signal.

4. The method according to claim 3, wherein the first part of the signal structure is represented as $x_1$, the second part of the signal structure is represented as $x_2$, and the third part of the signal structure is represented as $x_3$, and wherein $x_1$ and $x_3$ are calculated according to the following equations:

$$x_1 = k_{1,1}s_1 + k_{1,2}s_2 \qquad \text{Equation 1}$$

$$x_3 = k_{3,1}s_1 + k_{3,2}s_2 \qquad \text{Equation 2}$$

where $s_1$ and $s_2$ are two data signals, and represents the mapping of data signal $s_m$ into transmitted signal $x_n$.

5. The method according to claim 4, wherein the data signals $s_m$ comprise OFDM symbols, or any other type of modulated signal with a symbol length smaller than a length of the cyclic prefix.

6. The method according to claim 4, wherein the second data signal $s_2$ is ignored, and $k_{1,1} = 1$ and $k_{1,2} = -1$, such that:

$$x_1 = -x_3 = s \qquad \text{Equation 3.}$$

7. The method according to claim 6, wherein observed signals at receivers $y_1$ and $y_3$ are obtained by the following equations:

$$y_1 = h*x_1 + g*B + n_1 = h*s + g*B + n_1 \quad \text{Equation 4}$$

$$y_3 = h*x_3 + g*B + n_2 = -h*s + g*B + n_2 \quad \text{Equation 5}$$

where h and g represent the channel impulse response for signals s and B, respectively, and the symbol "*" represents a time domain convolution.

8. The method according to claim 7, wherein, given the observed signals at the receivers $y_1$ and $y_3$, an effect of interference over s and B can be removed by performing the following:

$$r_s = \frac{y_1 - y_3}{2} \approx h*s + \frac{n_1 - n_3}{2} \quad \text{Equation 6}$$

$$r_B = \frac{y_1 + y_3}{2} \approx g*B + \frac{n_1 + n_3}{2}. \quad \text{Equation 7}$$

9. The method according to claim 3, wherein the first part of the signal structure is represented as $x_1$, the second part of the signal structure is represented as $x_2$, and the third part of the signal structure is represented as $x_3$, and wherein $x_1$ and $x_3$ are calculated according to the following equations:

$$x_3 = -s \quad \text{Equation 8}$$

$$x_1 = 0 \quad \text{Equation 9.}$$

10. The method according to claim 9, wherein interference over s can be removed by performing the following:

$$r_s = y_1 - y_3 \approx h*S + n_1 - n_3 \quad \text{Equation 10.}$$

11. The method according to claim 1, wherein the using comprises transmitting the formed signal structure to cancel the interference caused by the interfering signal.

12. An apparatus, comprising:
at least one processor; and
at least one memory comprising computer program code,
the at least one memory and the computer program code configured, with the at least one processor, to cause the apparatus at least to
form a signal structure in a wireless system to match a structure of an interfering signal with repetitive time structure;
use the formed signal structure to eliminate interference caused by the interfering signal;
wherein the signal structure comprises parts that are synchronized with the repeated parts of the interfering signal structure to cancel the repetition of the interference, and the signal structure further comprises another part synchronized with the non-repeated parts of the interference signal.

13. The apparatus according to claim 12, wherein the interfering signal results from an orthogonal frequency-division multiplexing (OFDM) symbol of another wireless system, and the repetition of the interference signal is caused by a repetition of a cyclic prefix of the OFDM symbol.

14. The apparatus according to claim 13, wherein the signal structure comprises a first part synchronized to cancel the cyclic prefix of the OFDM symbol and a third part synchronized to cancel a repetition of the cyclic prefix of the OFDM symbol, and the signal structure further comprises a second part synchronized with a remainder of the OFDM signal.

15. The apparatus according to claim 14, wherein the first part of the signal structure is represented as $x_1$, the second part of the signal structure is represented as $x_2$, and the third part of the signal structure is represented as $x_3$, and wherein $x_1$ and $x_3$ are calculated according to the following equations:

$$x_1 = k_{1,1} s_1 + k_{1,2} s_2 \quad \text{Equation 11}$$

$$x_3 = k_{3,1} s_1 + k_{3,2} s_2 \quad \text{Equation 12}$$

where $s_1$ and $s_2$ are two data signals, and $k_{n,m}$ represents the mapping of data signal $s_m$ into transmitted signal $x_n$.

16. The apparatus according to claim 15, wherein the data signals $s_m$ comprise OFDM symbols, or any other type of modulated signal with a symbol length smaller than a length of the cyclic prefix.

17. The apparatus according to claim 16, wherein the second data signal $S_2$ is ignored, and $k_{1,1} = 1$ and $k_{1,2} = -1$, such that:

$$x_1 = -x_3 = s \quad \text{Equation 13.}$$

18. The apparatus according to claim 17, wherein observed signals at receivers $y_1$ and $y_3$ are obtained by the following equations:

$$y_1 = h*x_1 + g*B + n_1 = h*s + g*B + n_1 \quad \text{Equation 14}$$

$$y_3 = h*x_3 + g*B + n_2 = -h*s + g*B + n_2 \quad \text{Equation 15}$$

where h and g represent the channel impulse response for signals s and B, respectively, and the symbol "*" represents a time domain convolution.

19. The apparatus according to claim 18, wherein, given the observed signals at the receivers $y_1$ and $y_3$, an effect of interference over s and B can be removed by performing the following:

$$r_s = \frac{y_1 - y_3}{2} \approx h*s + \frac{n_1 - n_3}{2} \quad \text{Equation 16}$$

$$r_B = \frac{y_1 + y_3}{2} \approx g*B + \frac{n_1 + n_3}{2}. \quad \text{Equation 17}$$

20. The apparatus according to claim 14, wherein the first part of the signal structure is represented as $x_1$, the second part of the signal structure is represented as $x_2$, and the third part of the signal structure is represented as $x_3$, and wherein $x_1$ and $x_3$ are calculated according to the following equations:

$$x_3 = -s \quad \text{Equation 18}$$

$$x_1 = 0 \quad \text{Equation 19.}$$

21. The apparatus according to claim 20, wherein interference over s can be removed by performing the following:

$$r_s = y_1 - y_3 \approx h*s + n_1 - n_3 \quad \text{Equation 20.}$$

22. The apparatus according to claim 12, wherein the at least one memory and the computer program code are further configured, with the at least one processor, to cause the apparatus to transmit the formed signal structure to cancel the interference caused by the interfering signal.

23. The apparatus according to claim 12, wherein the apparatus further comprises a comb filter.

24. A non-transitory computer readable medium encoded with a computer program configured to control a processor to perform a process, comprising:
forming a signal structure in a wireless system to match a structure of an interfering signal with repetitive time structure;
using the formed signal structure to eliminate interference caused by the interfering signal;

wherein the signal structure comprises parts that are synchronized with the repeated parts of the interfering signal structure to cancel the repetition of the interference, and the signal structure further comprises another part synchronized with the non-repeated parts of the interference signal.

* * * * *